United States Patent
Tagami

(10) Patent No.: US 12,340,828 B1
(45) Date of Patent: Jun. 24, 2025

(54) MAGNETIC DISK APPARATUS AND METHOD

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Naoki Tagami, Yokohama Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/597,765

(22) Filed: Mar. 6, 2024

(30) Foreign Application Priority Data

Dec. 22, 2023 (JP) .................................. 2023-216541

(51) Int. Cl.
*G11B 5/596* (2006.01)

(52) U.S. Cl.
CPC ................................ *G11B 5/59627* (2013.01)

(58) Field of Classification Search
None
See application file for complete search history.

(56) References Cited

U.S. PATENT DOCUMENTS

| | | | |
|---|---|---|---|
| 6,940,679 B1 | 9/2005 | McNeil et al. | |
| 7,245,447 B2 | 7/2007 | Zaitsu | |
| 7,502,192 B1 * | 3/2009 | Wang | G11B 5/59627 360/75 |
| 8,243,381 B2 * | 8/2012 | Annampedu | G11B 5/59655 360/51 |
| 9,799,360 B2 * | 10/2017 | Tagami | G11B 20/1217 |
| 10,475,478 B2 * | 11/2019 | Tagami | G11B 5/59688 |
| 10,741,206 B2 * | 8/2020 | Tagami | G11B 5/59655 |
| 11,373,684 B2 * | 6/2022 | Kubota | G11B 5/012 |
| 11,495,255 B2 * | 11/2022 | Kudo | G11B 5/5547 |
| 11,521,647 B2 * | 12/2022 | Ogawa | G11B 5/59627 |
| 12,051,451 B2 * | 7/2024 | Yamamoto | G11B 5/59627 |
| 2017/0263275 A1 | 9/2017 | Tagami | |
| 2019/0287560 A1 | 9/2019 | Tagami | |
| 2020/0090691 A1 | 3/2020 | Tagami | |
| 2020/0335129 A1 * | 10/2020 | Tagami | G11B 5/59655 |
| 2024/0105225 A1 * | 3/2024 | Suzuki | G11B 5/59627 |

* cited by examiner

*Primary Examiner* — Fred Tzeng

(74) *Attorney, Agent, or Firm* — Knobbe, Martens, Olson & Bear, LLP

(57) ABSTRACT

According to an embodiment, a controller of a magnetic disk apparatus performs a write operation. In the write operation, the controller performs interpolation using RRO correction values that is obtained by measurement RRO at multiple first positions, and thereby acquires an RRO correction value for performing RRO correction at a position of a target data track. In the write operation, the controller sets WOS on the basis of a write permissible range change determination distance that is a distance between the target data track and one of the multiple first positions that is closest to the target data track.

18 Claims, 12 Drawing Sheets

MAGNETIC DISK APPARATUS AND METHOD

CROSS-REFERENCE TO RELATED APPLICATIONS

This application is based upon and claims the benefit of priority from Japanese Patent Application No. 2023-216541, filed on Dec. 22, 2023; the entire contents of which are incorporated herein by reference.

FIELD

Embodiments described herein relate generally to a magnetic disk apparatus and a method.

BACKGROUND

During a write operation using a magnetic disk apparatus, a write permissible range centered on a track center is set in the radial direction. The magnetic disk apparatus executes writing when the position of a magnetic head is within the write permissible range. When the position of the magnetic head deviates from the write permissible range, the magnetic disk apparatus withholds writing. The magnetic disk apparatus determines whether the position of the magnetic head is within the write permissible range or deviates from the write permissible range on the basis of a comparison between a positioning error with respect to a write target data track and a threshold corresponding to a boundary of the write permissible range. The threshold is referred to as a write offtrack slice (WOS) or a drift off level (DOL). Hereinafter, the threshold is denoted as WOS.

DETAILED DESCRIPTION

According to the present embodiment, a magnetic disk apparatus includes a magnetic head, a magnetic disk, and a controller. On the magnetic disk, multiple data tracks are provided. The controller is configured to perform a write operation using the magnetic head onto one of the multiple data tracks. The controller is configured to perform interpolation using first repeatable runout (RRO) correction values to acquire a second RRO correction value. The first RRO correction values are obtained by performing RRO measurement at multiple first positions. The second RRO correction value is an RRO correction value at a second position. The multiple first positions are radial positions in a radial direction of the magnetic disk. The second position is a position of a first data track being the one of the multiple data tracks. The controller is configured to execute RRO correction using the second RRO correction value when positioning the magnetic head above the first data track. The controller is configured to set a write permission threshold on the basis of a write permissible range change determination distance between one of the multiple first positions closest to the second position and the second position. The controller is configured to execute writing on the first data track when a positioning error of the first data track is not larger than the write permission threshold. The controller is configured to withhold writing on the first data track when the positioning error of the first data track is larger than the write permission threshold.

Hereinafter, the magnetic disk apparatus and a method according to an embodiment will be described in detail with reference to the attached drawings. The present invention is not limited to the following embodiments.

EMBODIMENTS

Figure 1:
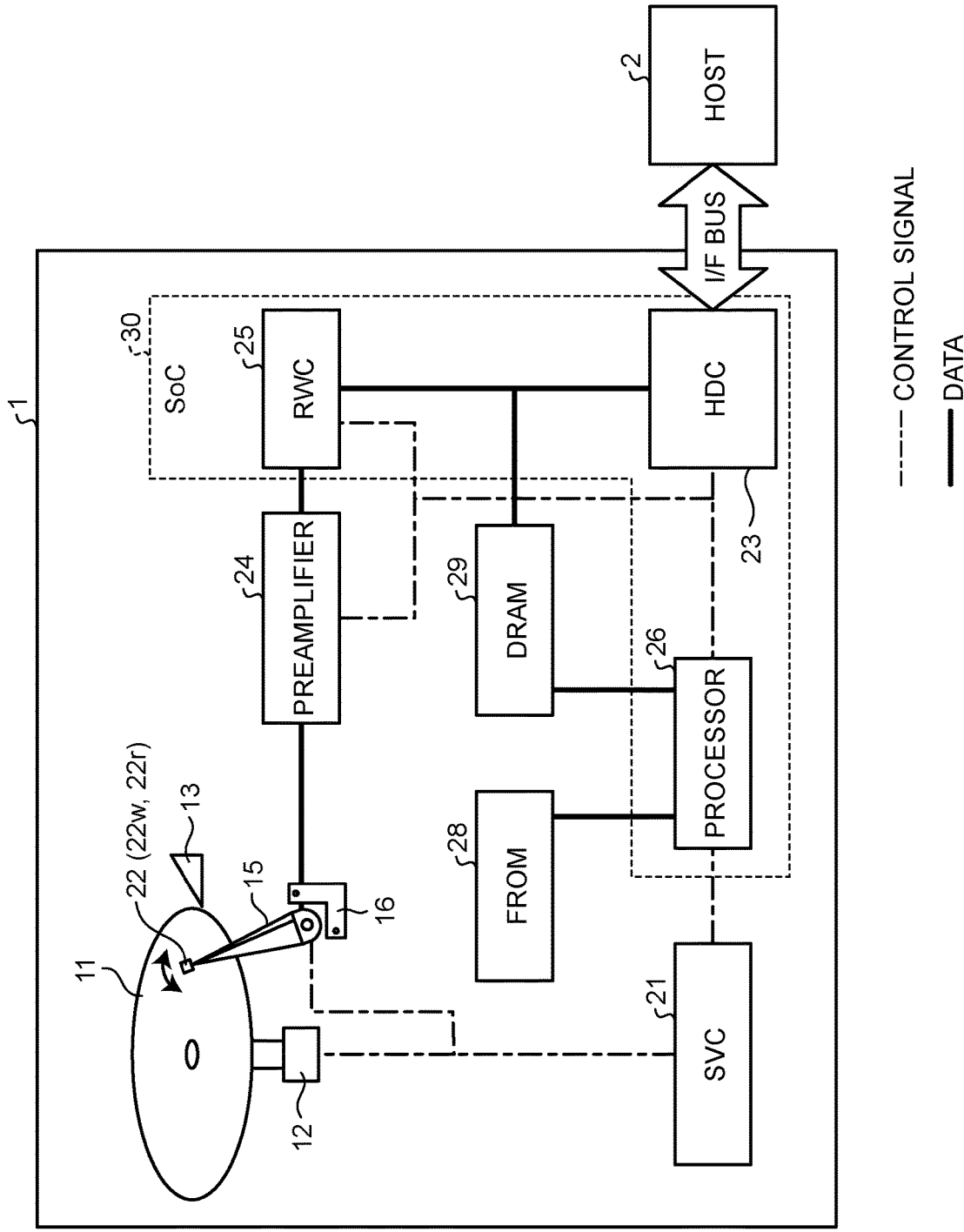
FIG. 1 is a schematic diagram illustrating an example of a configuration of a magnetic disk apparatus according to the embodiment.

FIG. 1 is a schematic diagram illustrating an example of a configuration of a magnetic disk apparatus 1 according to the embodiment.

The magnetic disk apparatus 1 is connected to a host 2. The magnetic disk apparatus 1 can receive an access command from the host 2. The access command includes a write command and a read command.

The magnetic disk apparatus 1 includes a magnetic disk 11 having a magnetic layer formed on a surface thereof. The magnetic disk apparatus 1 accesses the magnetic disk 11 in response to the access command. The access includes data writing and data reading.

Data writing and data reading are performed via a magnetic head 22. Specifically, in addition to the magnetic disk 11, the magnetic disk apparatus 1 includes a spindle motor (SPM) 12, a ramp 13, an actuator arm 15, a voice coil motor (VCM) 16, a servo controller (SVC) 21, the magnetic head 22, a hard disk controller (HDC) 23, a preamplifier 24, a read/write channel (RWC) 25, a processor 26, flash read only memory (FROM) 28, and dynamic random access memory (DRAM) 29.

The magnetic disk 11 is rotated at a predetermined rotation speed by the SPM 12 attached coaxially.

The SVC 21 is an integrated circuit having a function as a driver that drives the SPM 12 and the VCM 16. The processor 26 controls the rotation of the SPM 12 and the rotation of the VCM 16 via the SVC 21.

The magnetic head 22 performs writing and reading to and from the magnetic disk 11 by a write head 22w and a read head 22r provided therein. The magnetic head 22 is attached to a distal end of the actuator arm 15. The magnetic head 22 is moved in the radial direction of the magnetic disk 11 by the VCM 16 driven by the SVC 21. Note that one or both of the write head 22w and the read head 22r included in the magnetic head 22 may be provided in plurality for a single magnetic head 22.

For example, the magnetic head 22 is moved onto the ramp 13 during the time such as when the rotation of the magnetic disk 11 is stopped. The ramp 13 is configured to hold the magnetic head 22 at a position separated from the magnetic disk 11.

The preamplifier 24 is an integrated circuit that performs data writing and data reading via the magnetic head 22. The preamplifier 24 amplifies and outputs a signal read from the magnetic disk 11 by the magnetic head 22 during the read operation, and supplies the amplified signal to the RWC 25. In addition, the preamplifier 24 amplifies, during the write operation, a signal corresponding to write target data supplied from the RWC 25 and supplies the amplified signal to the magnetic head 22.

The HDC 23 performs control of transmission and reception of data with the host 2 via the I/F bus, control of the DRAM 29, and the like.

The DRAM 29 is used as a buffer for data to be transmitted to and received from the host 2. For example, the DRAM 29 is used to temporarily store write target data or data read from the magnetic disk 11.

The DRAM 29 is used as operation memory by the processor 26. The DRAM 29 is used as an area in which a firmware program is loaded and an area in which various types of management data are temporarily stored.

The RWC 25 modulates write target data supplied from the HDC 23, and supplies the modulated data to the preamplifier 24. In addition, the RWC 25 performs demodulation including error correction on the signal read from the magnetic disk 11 and supplied from the preamplifier 24, and then outputs the demodulated signal to the HDC 23 as digital data.

In one example, the processor 26 is a central processing unit (CPU). The processor 26 is connected to the FROM 28, and the DRAM 29.

The FROM 28 stores a firmware program, various types of setting information, and the like. Note that the firmware program may be stored in the magnetic disk 11.

The processor 26 performs overall control of the magnetic disk apparatus 1 by executing the firmware program stored in the FROM 28 or the magnetic disk 11. For example, the processor 26 loads the firmware program from the FROM 28 or the magnetic disk 11 to the DRAM 29, and executes control of the SVC 21, the preamplifier 24, the RWC 25, the HDC 23, and the like in accordance with the firmware program loaded to the DRAM 29.

Part of or all the functions of the processor 26 may be implemented by a hardware circuit such as a field-programmable gate array (FPGA) or an application specific integrated circuit (ASIC).

The HDC 23, the RWC 25, and the processor 26 are configured as a system-on-a-chip (SoC) 30, which is one integrated circuit. In addition to these, the SoC 30 may include other elements (for example, the FROM 28 and the DRAM 29). Note that the SoC 30 is an example of a controller.

In FIG. 1, a single magnetic disk 11 is illustrated, whereas the magnetic disk apparatus 1 may be provided with plural magnetic disks 11. When the magnetic disk apparatus 1 includes plural magnetic disks 11, those magnetic disks 11 are integrally rotated by the SPM 12.

In a case where the number of the magnetic disks 11 included in the magnetic disk apparatus 1 is N, the number of recording surfaces on which data can be written is 2N (N is an integer of 1 or more). In order to access 2N recording surfaces, the magnetic disk apparatus 1 includes 2N magnetic heads 22 that individually access different recording surfaces. The 2N magnetic heads 22 are identified by magnetic head numbers.

Figure 2:
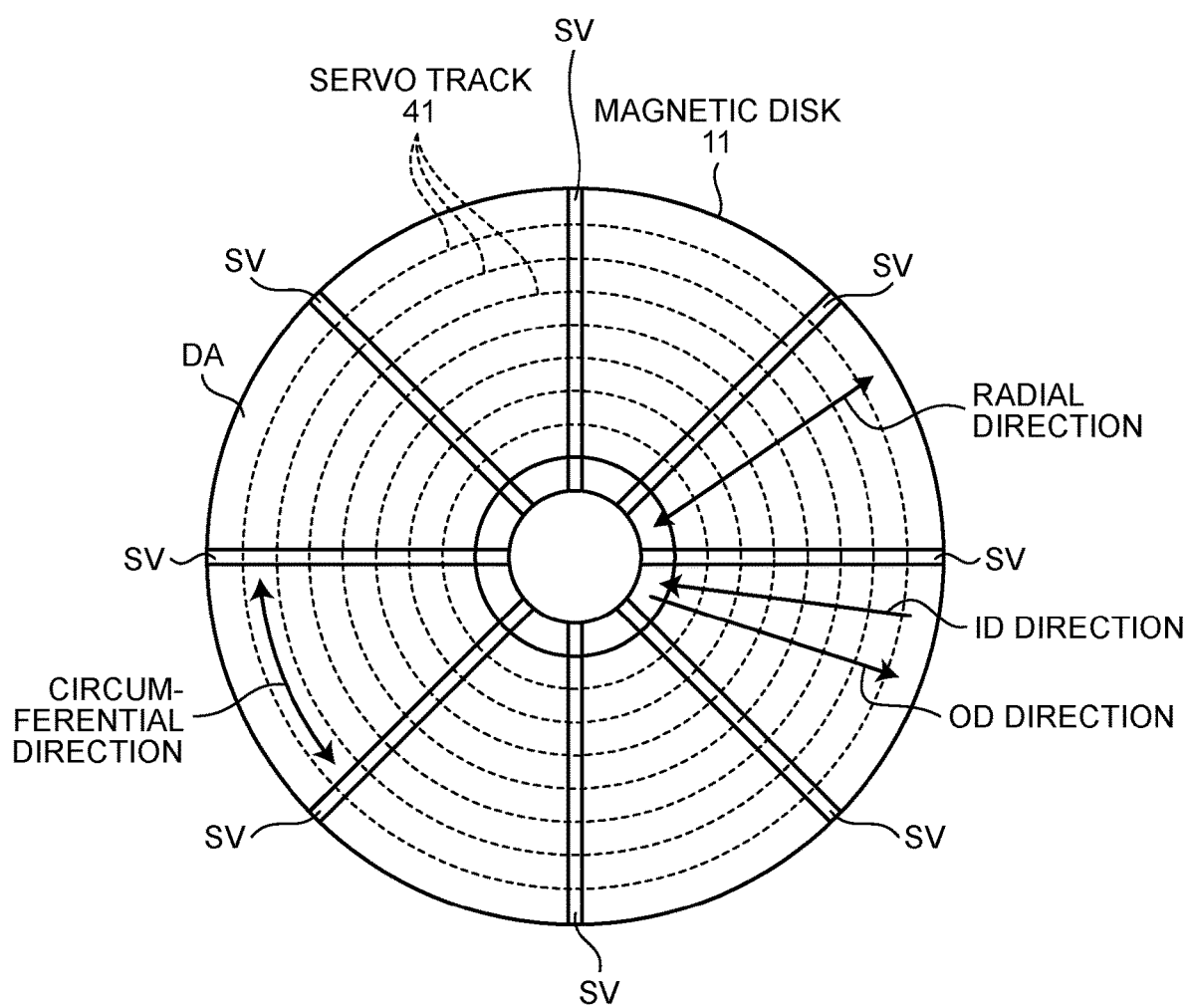
FIG. 2 is a schematic diagram illustrating an example of a configuration of a magnetic disk according to the embodiment.

FIG. 2 is a schematic diagram illustrating an example of a configuration of the magnetic disk 11 according to the embodiment.

Note that the present drawing illustrates a radial direction, a circumferential direction, an inner diameter (ID) direction, and an outer diameter (OD) direction. In the radial direction, a direction from the edge to the center of the magnetic disk 11 is an inner diameter (ID) direction, while a direction from the center to the edge of the magnetic disk 11 is an outer diameter (OD) direction.

Servo data used for positioning the magnetic head 22 is written to the magnetic disk 11 by using, for example, a servo writer or self-servo write (SSW) in a manufacturing step. According to FIG. 2, as an example of the arrangement of the servo region in which the servo data is written, servo regions SV are formed to be arranged in the radial direction and at predetermined intervals in the circumferential direction. A data region DA where data is written is provided between two servo regions SV adjacent to each other in the circumferential direction.

Servo tracks 41 being concentric tracks are provided in the radial direction of the magnetic disk 11. In addition, data tracks (denoted as data tracks DTRK) are provided on the surface on which the servo tracks 41 are provided.

The recording performance of each magnetic head 22 has variations due to manufacturing variations. In addition, the data holding capability varies on the recording surface of the magnetic disk 11. Therefore, in one example, the recording surface is segmented into multiple zones in the radial direction, and the arrangement density of the data track DTRK and the recording density of data along the data track DTRK are determined for each combination of the zone and the magnetic head 22. The track pitch of the data track DTRK may be differentiated from each zone and each recording surface. Note that the arrangement density of the data tracks DTRK is referred to as track per inch (TPI). The recording density of data along the data track DTRK is referred to as bit per inch (BPI).

Arrangement methods of the data track DTRK include conventional magnetic recording (CMR) and shingled magnetic recording (SMR). The CMR method is a method in which each data track DTRK is arranged so as not to overlap with the data track DTRK adjacent in the radial direction. The SMR method is a method in which data of one data track DTRK of two data tracks DTRK adjacent to each other in the radial direction of the magnetic disk 11 is written to be superimposed on a part of data of the other data track DTRK of the two data tracks DTRK. The SMR method can form the track pitch of the data track DTRK to be narrower than the width (WHw) of the write head 22w of the magnetic head 22, making it possible to obtain a recording density higher than the case of the CMR method. On the other hand, the SMR method has random write performance lower than that of the CMR method.

The arrangement method of the data track DTRK may be fixed to the CMR method or the SMR method, or may be dynamically changeable between the CMR method and the SMR method. For example, the magnetic disk apparatus 1 may be configured to be able to change the arrangement method of the data tracks DTRK between the CMR method and the SMR method for a partial region or the entire region of the recording surface on the basis of an instruction from a user. Note that a hard disk device capable of changing the arrangement method of the data tracks DTRK between the CMR method and the SMR method is referred to as a hybrid hard disk drive (hybrid HDD).

The magnetic disk apparatus 1 stores the setting information about the positional relationship between the servo tracks 41 and each data track DTRK. The magnetic disk apparatus 1 executes control of positioning the magnetic head 22 on the target data track DTRK (denoted as positioning control) on the basis of the servo data recorded in the servo region SV. The positioning control includes operations such as a seek operation which is an operation of moving the magnetic head 22 in the radial direction toward the target data track DTRK and a tracking operation of maintaining the magnetic head 22 above the target data track DTRK.

The servo data can include a preamble, a servo mark, a gray code, a burst pattern, and a post code.

The preamble is pattern data of a single period that periodically changes in the circumferential direction. The preamble is used to adjust the amplitude, phase, and frequency of sampling data when the servo waveform read by the read head 22r is taken into the RWC 25 as the sampling data on the basis of the servo clock.

The servo mark is pattern data for determining a demodulation timing of the servo data. The controller 30 judges, based on the servo mark detection timing, the demodulation timing of various types of servo data read by the read head 22r thereafter.

The gray code includes a cylinder address and a sector address. The cylinder address is used for identifying each servo track 41 provided on the magnetic disk 11. The sector address is used for identifying each servo region SV on the servo track 41.

The burst pattern is pattern data used to detect the amount of positional deviation of the servo track 41 from the track center indicated by the cylinder address included in the gray code. The amount of positional deviation of the servo track 41 from the track center is referred to as a burst offset.

The post code is data for correcting repeatable runout (RRO).

The shape of each track (the data track DTRK and the servo track 41) is ideally a perfect circle. However, the servo track 41 is distorted due to vibration received at the time of writing of the servo data, servo pattern quality, and the like. Therefore, the position in the radial direction (radial position) of the servo track 41 specified on the basis of the combination of the cylinder address and the burst offset deviates from the position, in the radial direction, of the servo track 41 with an ideal shape in some cases. Since this positional deviation is repeatedly generated in the same manner with one rotation of the magnetic disk 11 (and the SPM 12) as a cycle, it is referred to as RRO. The post code is obtained by coding the correction value of the RRO.

The SoC 30 (for example, the processor 26) performs correction using the RRO correction value recorded as the post code on the radial position of the magnetic head 22 obtained by the combination of the cylinder address and the burst offset, thereby acquiring the radial position of the magnetic head 22 in which the positional deviation due to the RRO has been canceled. The correction using the RRO correction value is denoted as RRO correction.

Note that the position where the post code is written is not limited to the servo region SV. The post code may be written in the data region DA or may be stored in the FROM 28.

The manufacturing step of the magnetic disk apparatus 1 includes RRO measurement. Regarding RRO, it is ideal that the RRO measurement be performed at a final set position of each data track DTRK. However, measuring the RRO for each data track DTRK would take a large amount of time in the manufacturing step. In addition, since the position of each data track DTRK can be dynamically changed in the hybrid HDD by its nature, the position of each data track DTRK cannot be specified in the manufacturing step. In order to cope with these, in the embodiment, the magnetic disk apparatus 1 is configured to be capable of executing a linear RRO correction operation.

Figure 3:
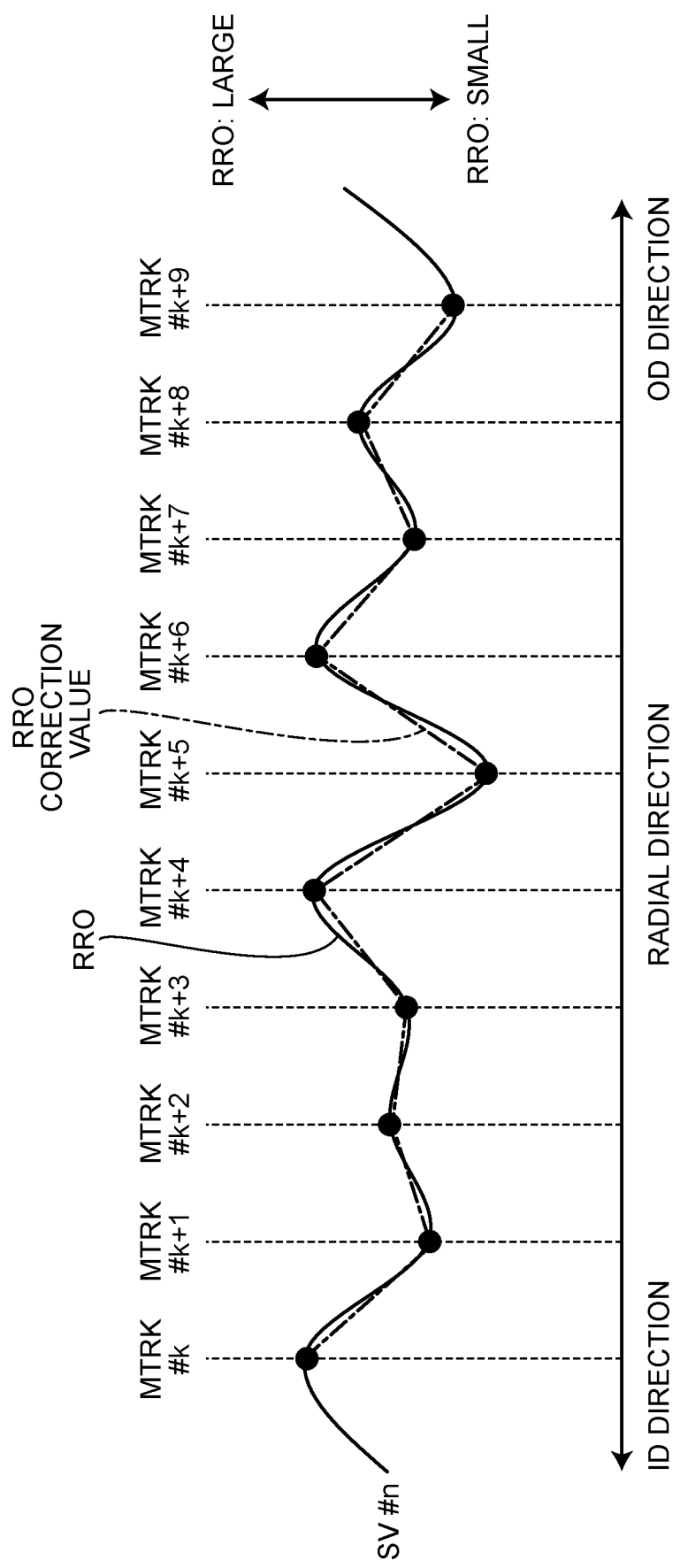
FIG. 3 is a diagram illustrating a linear RRO correction operation according to the embodiment.

FIG. 3 is a diagram illustrating a linear RRO correction operation according to the embodiment. In the drawing, the horizontal axis represents the radial position, and the vertical axis represents the magnitude of the RRO. FIG. 3 illustrates an example of a change in the RRO in the radial direction in a certain servo region SV #n.

In the manufacturing step, a virtual track is set at each of predetermined radial positions. In each virtual track, the RRO of the servo region included in the virtual track is measured.

Each virtual track may be set to match the servo track 41, or may be set with reference to the servo tracks 41. Each virtual track may be one servo track 41 selected for every predetermined servo track 41 arranged continuously in the radial direction, or one or more virtual tracks may be set between the servo tracks 41. In a case where the positions of the final data tracks DTRK are known, each virtual track may be set to match one data track DTRK selected for each of the predetermined data tracks DTRK arranged continuously in the radial direction.

Hereinafter, each virtual track is denoted as a measurement track MTRK. Note that the radial positions of the set measurement tracks MTRK are an example of the first positions.

A solid curve illustrated in FIG. 3 indicates RRO. The filled circles each indicate an RRO measurement value in the measurement tracks #k to #k+9. The diagram indicates that the measurement position of the RRO, namely, each measurement track MTRK is discretely located in the radial direction.

In the positioning control using the linear RRO correction operation, the controller 30 performs linear interpolation between the measurement value of the RRO in the measurement track MTRK closest to the magnetic head 22 on the OD side and the measurement value of the RRO in the measurement track MTRK closest to the magnetic head 22 on the ID side, thereby acquiring the RRO correction value at the position of the magnetic head 22. In short, the one-dot chain line in FIG. 3 indicates the RRO correction value to be used by the controller 30 to correct the RRO.

The RRO measurement value in each measurement track MTRK is stored at a predetermined position of the servo region SV, the FROM 28, or the magnetic disk 11 as the RRO correction value in each measurement track MTRK. The controller 30 executes the linear RRO correction operation using the measurement value of the RRO in each measurement track MTRK.

In this manner, the controller 30 can perform the RRO correction at an optional position in the radial direction by linear interpolation using the RRO correction values obtained at the positions discretely set in the radial direction.

However, positioning accuracy after the linear RRO correction in the above-described linear RRO correction operation sometimes lacks uniformity in the radial direction.

Figure 4:
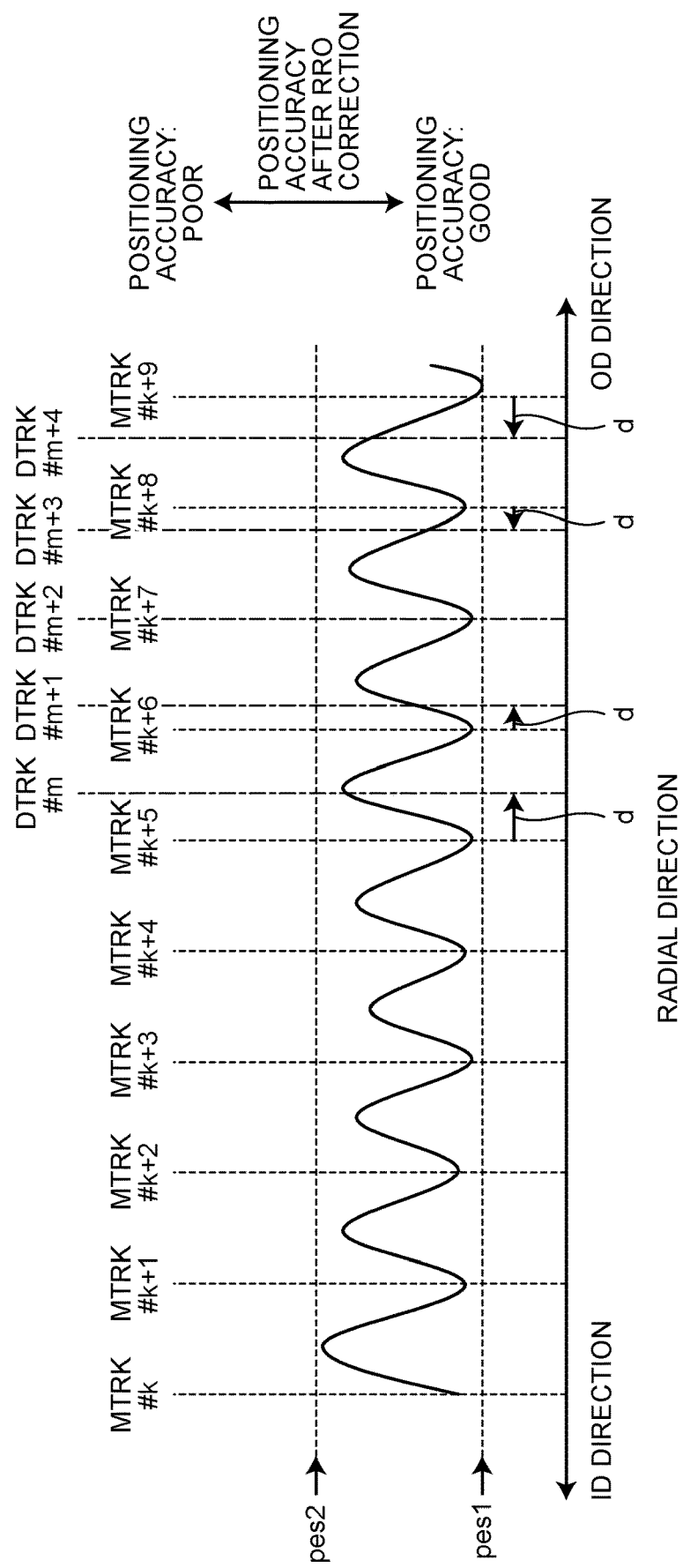
FIG. 4 is a diagram illustrating a distribution of positioning accuracy after the linear RRO correction operation according to the embodiment.

FIG. 4 is a diagram illustrating a distribution of positioning accuracy after the linear RRO correction operation according to the embodiment. In FIG. 4, the horizontal axis represents the radial position, and the vertical axis represents the evaluation index of the positioning accuracy. Hereinafter, the positioning accuracy means the positioning accuracy after the linear RRO correction operation.

As long as the evaluation index of the positioning accuracy corresponds to the positioning accuracy, the evaluation index of the positioning accuracy is not limited to specific numerical information. For example, the evaluation index of the positioning accuracy may be a standard deviation of the RRO measurement values for one rotation. The evaluation index of the positioning accuracy may be a difference between the maximum value and the minimum value of the RRO measurement values for one rotation. When the standard deviation of the RRO measurement values of one rotation or the difference between the maximum value and the minimum value of the RRO measurement values of one rotation is used as the evaluation index of the positioning accuracy, the evaluation index takes a value such that the better the positioning accuracy, the smaller the value, and the worse the positioning accuracy, the larger the value.

As illustrated in FIG. 4, the positioning accuracy takes its locally best value at the position matching each measurement track MTRK (refer to the position near pes1), and worsens together with an increase in distance from the closest measurement track TRK. The positioning accuracy takes its locally worst value at an intermediate point between the two measurement tracks TRK adjacent to each other (refer to the position near pes2).

The final position of each data track DTRK does not necessarily match any of the measurement tracks TRK. Therefore, the positioning operation after the linear RRO correction operation in each data track DTRK varies depending on the distance to the closest measurement track TRK.

For instance, the position of the data track DTRK #m+2 matches the position of the measurement track MTRK #k+7, which is the measurement track MTRK closest to the data track DTRK #m+2. The data track DTRK #m+3 and the measurement track MTRK #k+8, which is the measurement track MTRK closest to the data track DTRK #m+3, are slightly separated from each other. In addition, a distance between the data track DTRK #m+4 and the measurement track MTRK #k+9, which is the measurement track MTRK closest to the data track DTRK #m+4, is larger than a distance between the data track DTRK #m+3 and the measurement track MTRK #k+8, which is the measurement track MTRK closest to the data track DTRK #m+3. Therefore, the positioning accuracy gets worse in an order of the data track DTRK #m+2, the data track DTRK #m+3, and data track DTRK #m+4.

The data track DTRK #m+1 and the measurement track MTRK #k+6, which is the measurement track MTRK closest to the data track DTRK #m+1, are slightly separated from each other. A distance between the data track DTRK #m and the measurement track MTRK #k+5, which is the measurement track MTRK closest to the data track DTRK #m, is larger than a distance between the data track DTRK #m+1 and the measurement track MTRK #k+6, which is the measurement track MTRK closest to the data track DTRK #m+1. Therefore, the positioning accuracy gets worse in an order of the data track DTRK #m+2, the data track DTRK #m+1, and the data track DTRK #m.

In this manner, the positioning accuracy after the linear RRO correction operation in the data track DTRK changes such that the longer the distance to the measurement track MTRK closest to the data track DTRK, the worse the positioning accuracy will be.

Hereinafter, the distance between the target data track DTRK and the measurement track MTRK closest to the target data track DTRK is denoted as a write permissible range change determination distance d.

At the time of the write operation, in order to prevent data of the data track DTRK adjacent to the target data track DTRK from being erased by overwriting by the write operation, the write permissible range is set for the target data track DTRK.

Figure 5:
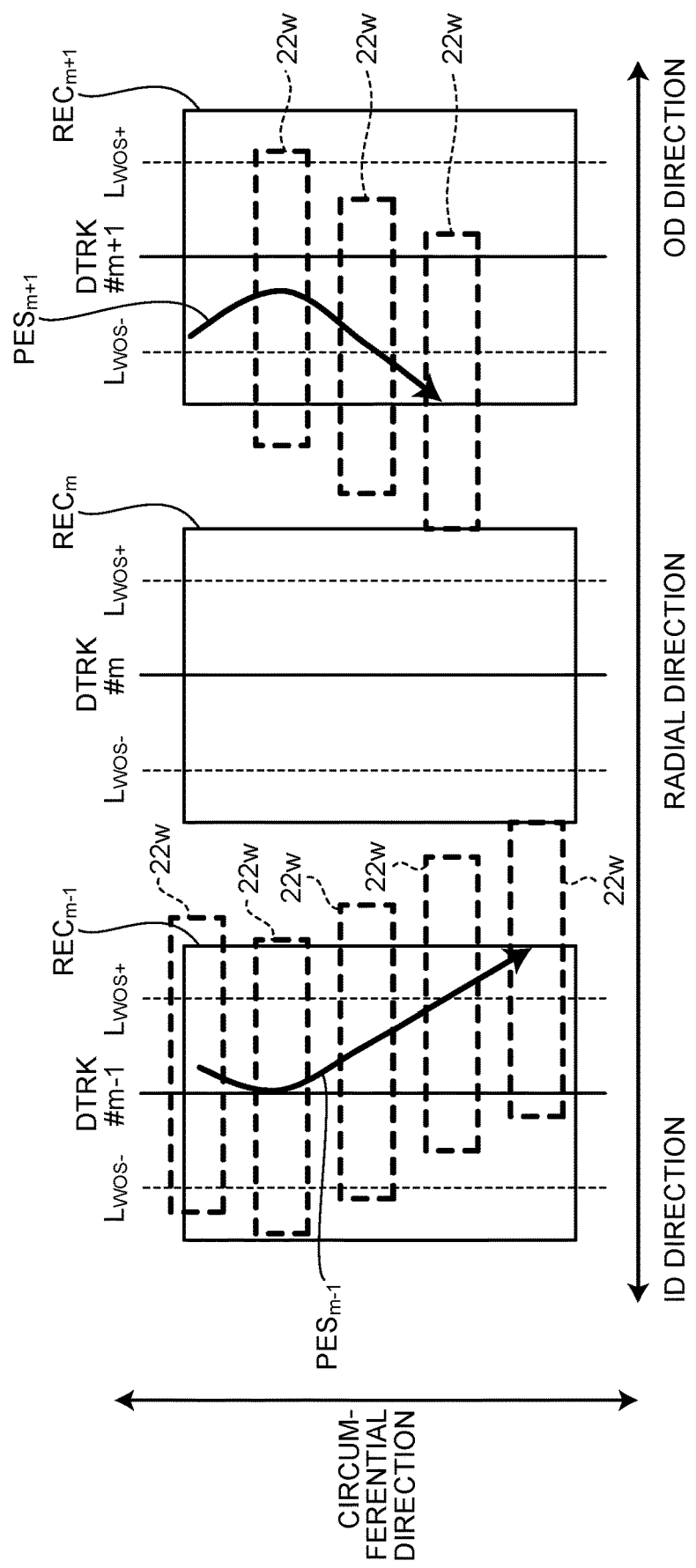
FIG. 5 is a diagram illustrating an example of a write permissible range according to the embodiment.

FIG. 5 is a diagram illustrating an example of the write permissible range according to the embodiment. In the drawing, a write range REC in design is illustrated for each of the data track DTRK #m−1, the data track DTRK #m, and the data track DTRK #m+1. The write range $REC_m$ is a write range REC in design for the data track DTRK #m. The write range $REC_{m-1}$ is a write range REC in design for the data track DTRK #m−1. The write range $REC_{m+1}$ is a write range REC in design for the data track DTRK #m+1. Each write range REC is defined by an element width of the write head 22w centered on the track center of the data track DTRK.

Additionally, FIG. 5 illustrates two lines $L_{WOS-}$ and $L_{WOS+}$ each defining a write permissible range for each of the data track DTRK #m−1, the data track DTRK #m, and the data track DTRK #m+1. The line $L_{WOS-}$ is a line at a position separated from the track center by WOS in the ID direction. The line $L_{WOS+}$ is a line at a position separated from the track center by WOS in the OD direction.

Here is an assumable case where a write operation is performed on the data track DTRK #m, and thereafter, a write operation is executed on the data track DTRK #m−1 and the data track DTRK #m+1. $PES_{m-1}$ indicates an example of a trajectory of the magnetic head 22 (more precisely, the write head 22w) at the time of the write operation when the write operation is executed for the data track DTRK #m−1. $PES_{m+1}$ indicates an example of a trajectory of the magnetic head 22 (more precisely, the write head 22w) at the time of the write operation when the write operation is executed for the data track DTRK #m+1.

In the write operation for the data track DTRK #m−1, when it is detected that the position of the magnetic head 22 has exceeded the write permissible range, the write operation is interrupted. Similarly, in the write operation for the data track DTRK #m+1, when it is detected that the position of the magnetic head 22 has exceeded the write permissible range, the write operation is interrupted. This makes it possible to prevent the situation in which the data of the already written data track DTRK #m is erased by overwriting with the data written to the data track DTRK #m−1 or the data track DTRK #m+1.

Note that the position of the magnetic head 22 can be obtained only from servo regions SV arranged at intervals in the circumferential direction. When the magnetic head 22 is located at a position between the servo regions SV, the controller 30 cannot obtain the radial position. Therefore, even when it is confirmed on the basis of the servo data that the position of the magnetic head 22 does not deviate from the write permissible range, the radial position of the magnetic head 22 can deviate from the write permissible range due to disturbance or the like in the data region DA. Such a deviation of the position of the magnetic head 22 from the write permissible range is referred to as overrun.

When the positioning accuracy is bad, the magnetic head 22 moves to a position separated from the track center in some cases. In such a case, the amount of overrun increases. On the other hand, setting the WOS too small with respect to the positioning accuracy would increase the frequency of interruption of the write operation, leading to deterioration of the write performance. To handle these, the WOS is set in accordance with the positioning accuracy.

However, the magnetic disk apparatus 1 of the embodiment that executes linear RRO correction operation can have the positioning accuracy different for each data track DTRK. In such a case, storing the WOS set value for each data track DTRK would require a large capacity of nonvolatile storage area for storing a WOS set value group.

In view of this, according to the embodiment, the controller 30 is configured to dynamically set the WOS in accordance with the write permissible range change determination distance d between the write target data track DTRK and the measurement track MTRK closest to the write target data track DTRK.

More specifically, the controller 30 stores at least a WOS reference value $WOS_{ref}$ that is common to multiple data tracks DTRK. The controller 30 acquires a change amount dWOS of the WOS on the basis of the write permissible range change determination distance d. Then, the controller 30 changes the reference value $WOS_{ref}$ by the change amount dWOS, and thereby acquires a WOS set value $WOS_{target}$ of the target data track DTRK.

According to the embodiment, the reference value $WOS_{ref}$ is individually stored in advance in units larger than one data track DTRK. This makes it possible to reduce the capacity of the nonvolatile storage area required to store the information regarding the WOS as compared with the case of storing the set value group of the WOS for each data track DTRK.

Here, it is assumed, as one example, the reference value $WOS_{ref}$ is stored in advance for each region in units of setting of TPI and BPI, namely, for each region specified by the head number and the zone number.

Figure 6:
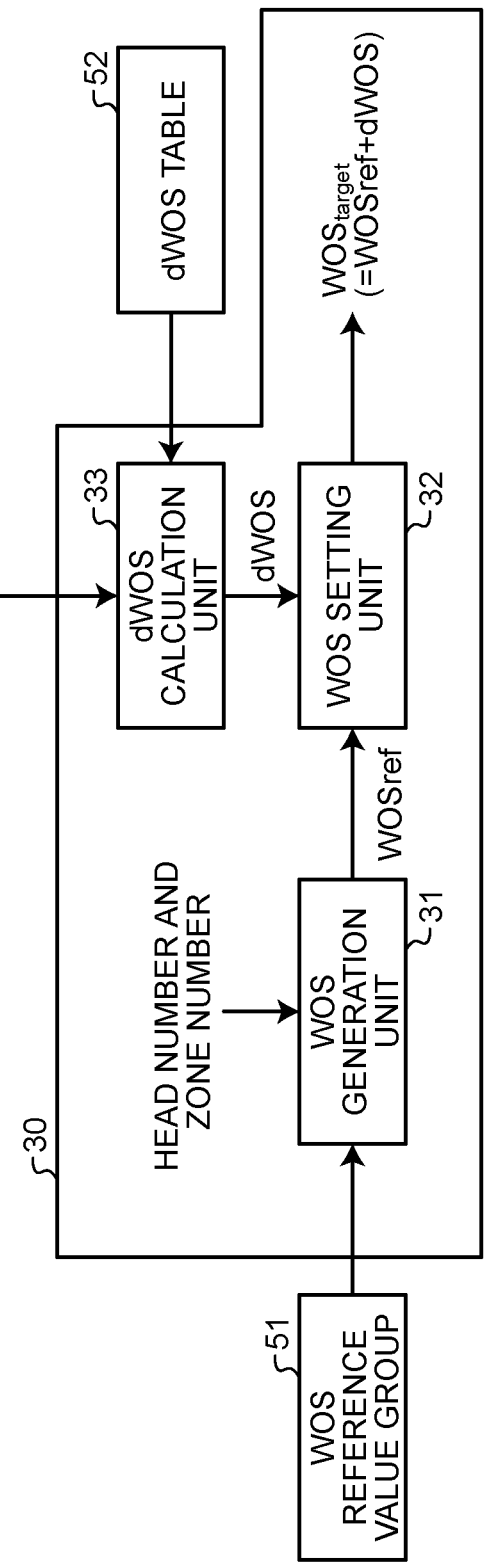
FIG. 6 is a diagram illustrating an example of a functional configuration of a controller according to the embodiment.

FIG. 6 is a diagram illustrating an example of a functional configuration of the controller 30 according to the embodiment.

The controller 30 includes a WOS generation unit 31, a WOS setting unit 32, and a dWOS calculation unit 33. In addition, a WOS reference value group 51 and a dWOS table 52 are stored in a predetermined storage area, for example, the FROM 28 or the magnetic disk 11, and thus, the controller 30 can make reference to the WOS reference value group 51 and the dWOS table 52. The controller 30 may load a part of or all the WOS reference value group 51 and the dWOS table 52 to the DRAM 29 and refer to these pieces of information loaded to the DRAM 29. The storage area in which the WOS reference value group 51 and the dWOS table 52 are stored is an example of a storage device. The WOS is an example of a write permission threshold.

The WOS reference value group 51 is information obtained by collecting reference values $WOS_{ref}$ set for each region specified by the head number and the zone number, for the entire region of the magnetic disk 11.

The dWOS table 52 is a table that defines a correspondence relationship between the write permissible range change determination distance d and the change amount dWOS. Note that the dWOS table 52 is an example of first information that defines a correspondence relationship between the multi-valued write permissible range change determination distance d and the multi-valued change amount dWOS. The format of the first information is not limited to the table. The first information may be a function. The dWOS table 52 will be described in detail below.

The WOS generation unit 31 acquires the reference value $WOS_{ref}$ used in the write operation for the write target data track DTRK from the WOS reference value group 51. The WOS generation unit 31 acquires the reference value $WOS_{ref}$ on the basis of the head number of the magnetic head 22 that accesses the write target data track DTRK and the zone number of the zone to which the write target data track DTRK belongs.

In the following description, the data track DTRK being a write target is denoted as a target data track DTRK. The data track DTRK adjacent to the target data track DTRK is denoted as an adjacent data track DTRK.

The dWOS calculation unit 33 calculates the write permissible range change determination distance d, namely, calculates the distance between the target data track DTRK and the measurement track MTRK closest to the target data track DTRK. Position information of each data track DTRK and position information of each measurement track MTRK are known. The dWOS calculation unit 33 calculates the write permissible range change determination distance d on the basis of the position information of each data track DTRK, the position information of each measurement track MTRK, the cylinder address of the target data track DTRK, and the like. The dWOS calculation unit 33 acquires the change amount dWOS corresponding to the write permissible range change determination distance d obtained by calculation by referring to information input from the dWOS table 52 to the dWOS calculation unit 33, namely, referring to the table that defines a correspondence relationship between the write permissible range change determination distance d and the change amount dWOS.

The WOS setting unit 32 calculates a WOS set value $WOS_{target}$ of the target data track DTRK on the basis of the reference value $WOS_{ref}$ acquired by the WOS generation unit 31 and the change amount dWOS acquired by the dWOS calculation unit 33. Here, as an example, the set value $WOS_{target}$ is obtained by adding the reference value $WOS_{ref}$ and the change amount dWOS.

Figure 7:
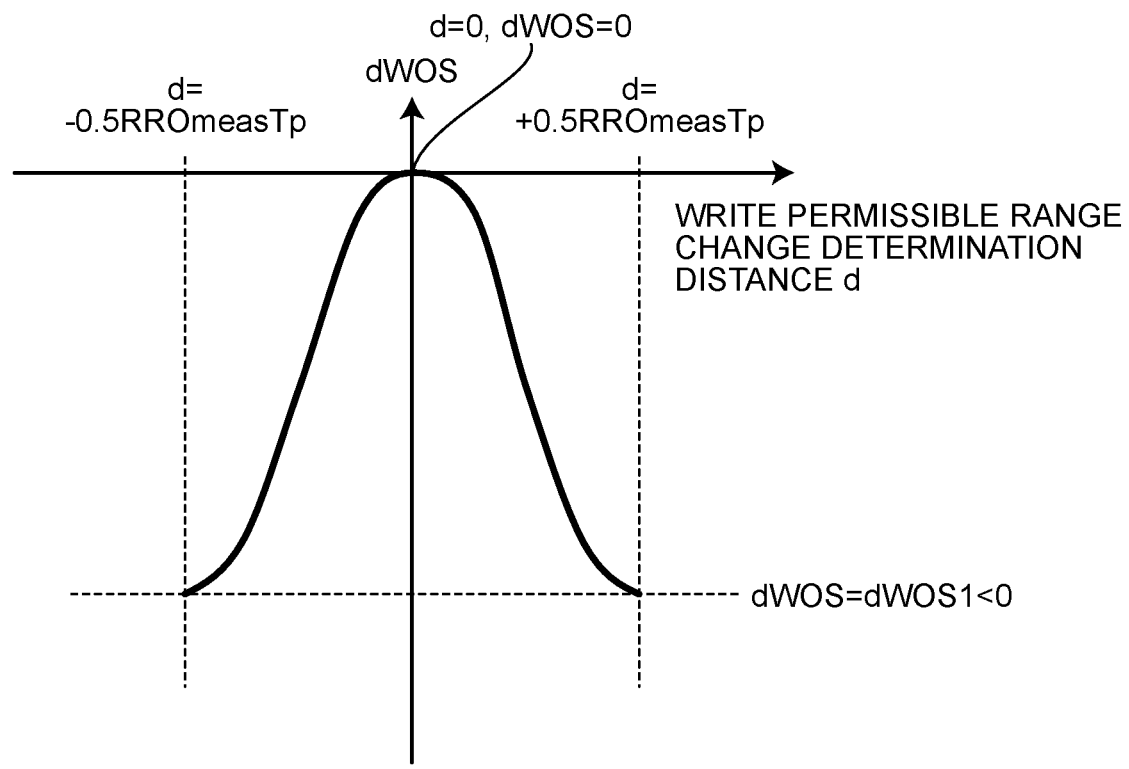
FIG. 7 is a diagram illustrating an example of a relationship between a write permissible range change determination distance d and a change amount dWOS, defined by a dWOS table of the embodiment.

FIG. 7 is a diagram illustrating an example of the relationship between the write permissible range change determination distance d defined by the dWOS table 52 of the embodiment and the change amount dWOS. In the drawing, the horizontal axis represents the write permissible range change determination distance d, and the vertical axis represents the change amount dWOS.

RROmeasTp is a pitch of the measurement track MTRK. The write permissible range change determination distance d (to be exact, the absolute value of the write permissible range change determination distance d) is maximized at just an intermediate position between the two measurement tracks MTRK adjacent to each other. Accordingly, the correspondence relationship between the write permissible range change determination distance d and the change amount dWOS is defined for the range of the write permissible range change determination distance d in a range from −0.5×RROmeasTp to 0.5×RROmeasTp.

The reference value $WOS_{ref}$ is determined on the basis of predetermined positioning accuracy. In the example illustrated in FIG. 7, the reference value $WOS_{ref}$ is supposed to be determined on the basis of the positioning accuracy in the case of d=0. In other words, in the case of d=0, by using the reference value $WOS_{ref}$ as it is as the set value $WOS_{target}$, the data of the adjacent data track can be guaranteed even when the magnetic disk apparatus 1 receives a disturbance such as server rack fan vibration.

In a case where the write permissible range change determination distance d is different from 0, the positioning accuracy is worse than that in the case where d=0. In other words, in a case where the write permissible range change determination distance d is different from 0, data of the adjacent data track cannot always be guaranteed when the magnetic disk apparatus 1 receives the same disturbance as in the case of d=0. Accordingly, as illustrated in FIG. 7, in a case where the write permissible range change determination distance d is different from 0, the change amount dWOS is set to a negative value, narrowing the write permissible range. With this configuration, even when the magnetic disk apparatus 1 receives a disturbance during the write operation, it is possible to prevent the data of the adjacent data track DTRK from being erased due to overrun.

At d=−0.5×RROmeasTp or d=0.5×RROmeasTp, the positioning accuracy takes its locally worst value. Therefore, the change amount dWOS takes a minimum value.

In this manner, according to the example illustrated in FIG. 7, the relationship between the write permissible range change determination distance d and the change amount dWOS is defined so that the data of the adjacent data track can be guaranteed regardless of the write permissible range change determination distance d.

Figure 8:
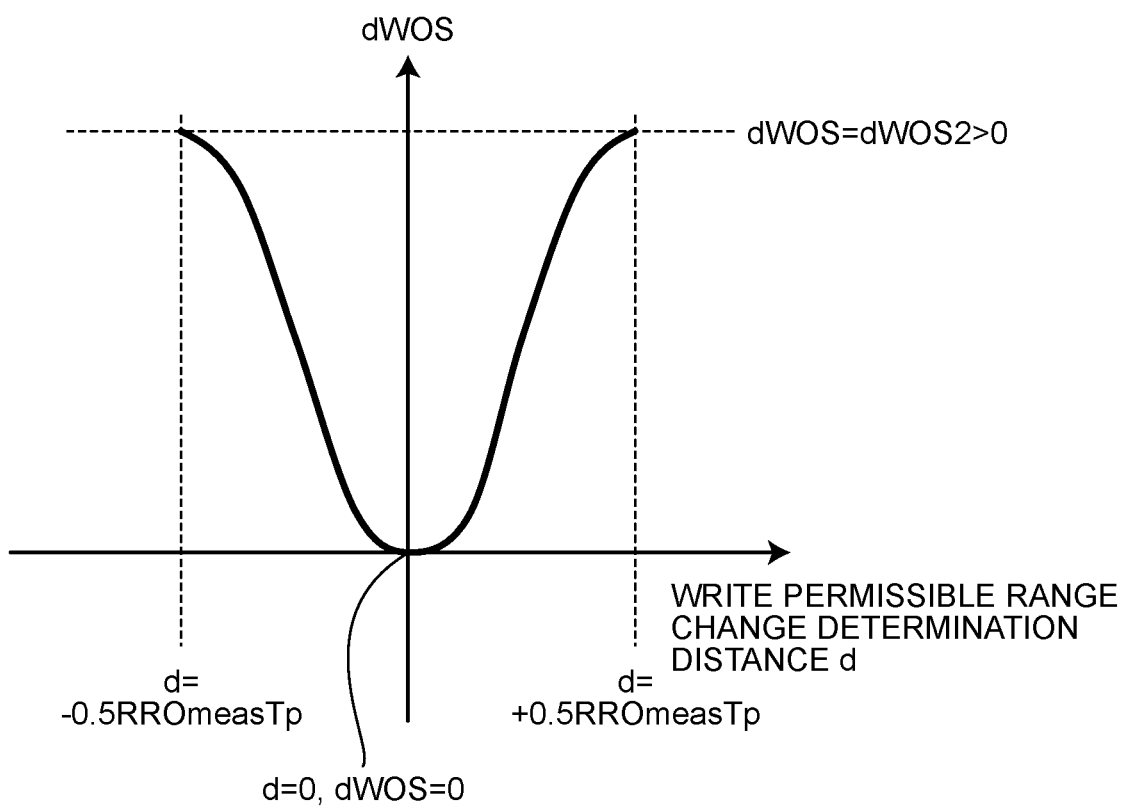
FIG. 8 is a diagram illustrating an example of a relationship between the write permissible range change determination distance d and the change amount dWOS, defined by the dWOS table of the embodiment.

FIG. 8 is a diagram illustrating an example of a relationship between the write permissible range change determination distance d defined by the dWOS table 52 of the embodiment and the change amount dWOS. In the drawing, the horizontal axis represents the write permissible range change determination distance d, and the vertical axis represents the change amount dWOS.

In the example illustrated in FIG. 8, in the case of d=0, the reference value $WOS_{ref}$ is determined not only to guarantee the data of the adjacent data track but also to guarantee the write performance.

In a case where the write permissible range change determination distance d is different from 0, the positioning accuracy is worse than that in a case where d=0, and the write performance is deteriorated. In order to suppress deterioration in the write performance, the change amount dWOS takes a positive value when the write permissible range change determination distance d is different from 0. In short, the write permissible range is widened. With this configuration, the write performance can be guaranteed even when the magnetic disk apparatus 1 receives a disturbance during the write operation.

At d=−0.5×RROmeasTp or d=0.5×RROmeasTp, the positioning accuracy takes its locally worst value. Therefore, the change amount dWOS takes a maximum value.

Note that excessively widening the write permissible range can increase the case where the risk of erasing the data of the adjacent data track DTRK due to overrun exceeds an allowable level. An upper limit value may be set to the change amount dWOS so that the risk of erasing the data of the adjacent data track DTRK does not exceed an allowable level.

In this manner, according to the example illustrated in FIG. 8, the relationship between the write permissible range change determination distance d and the change amount dWOS is defined so that the write performance can be guaranteed regardless of the write permissible range change determination distance d.

Next, operations of the magnetic disk apparatus 1 of the embodiment will be described.

Figure 9:
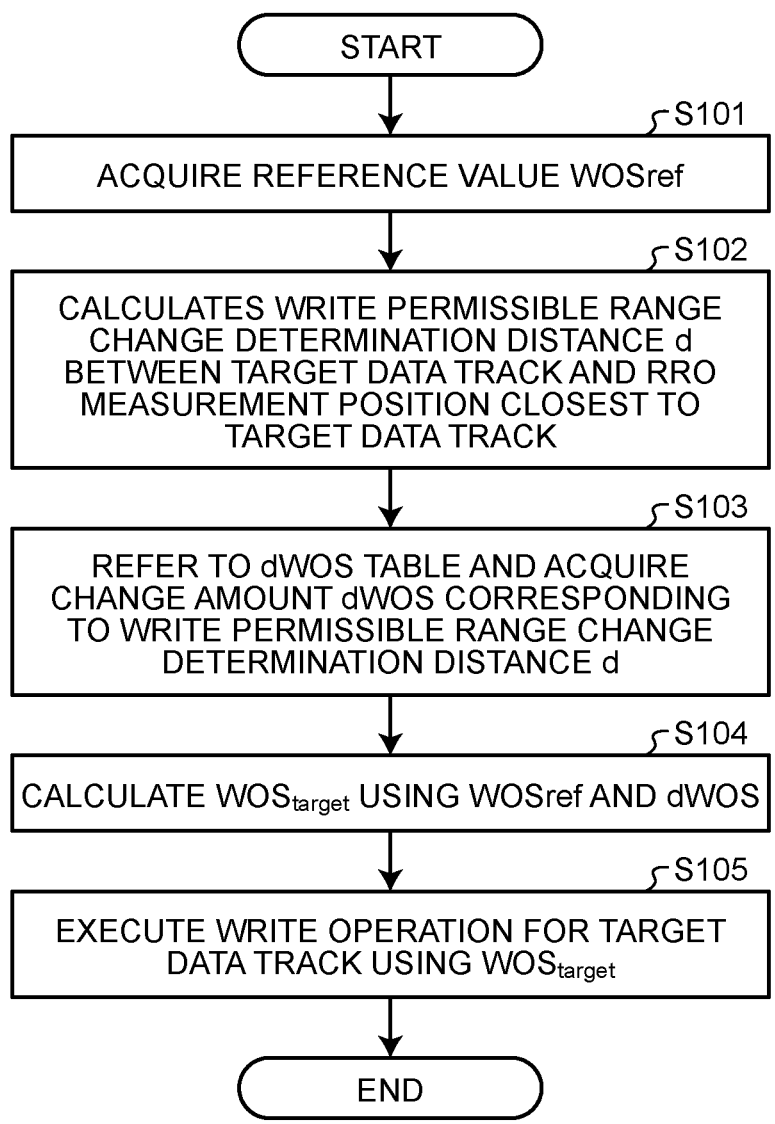
FIG. 9 is a flowchart illustrating an example of an operation of the magnetic disk apparatus of the embodiment in a write operation.

FIG. 9 is a flowchart illustrating an example of the operation of the magnetic disk apparatus 1 of the embodiment in the write operation. In the description of this figure, the write target data track DTRK in the write operation is an example of the first data track.

First, the WOS generation unit 31 acquires the reference value $WOS_{ref}$ from the WOS reference value group 51 (S101). The WOS generation unit 31 acquires the reference value $WOS_{ref}$ on the basis of the head number indicating the magnetic head 22 that accesses the target data track DTRK and the zone number indicating the zone to which the target data track DTRK belongs.

The dWOS calculation unit 33 calculates the write permissible range change determination distance d, namely, the distance between the target data track DTRK and the measurement track MTRK closest to the target data track DTRK (S102).

Figure 10:
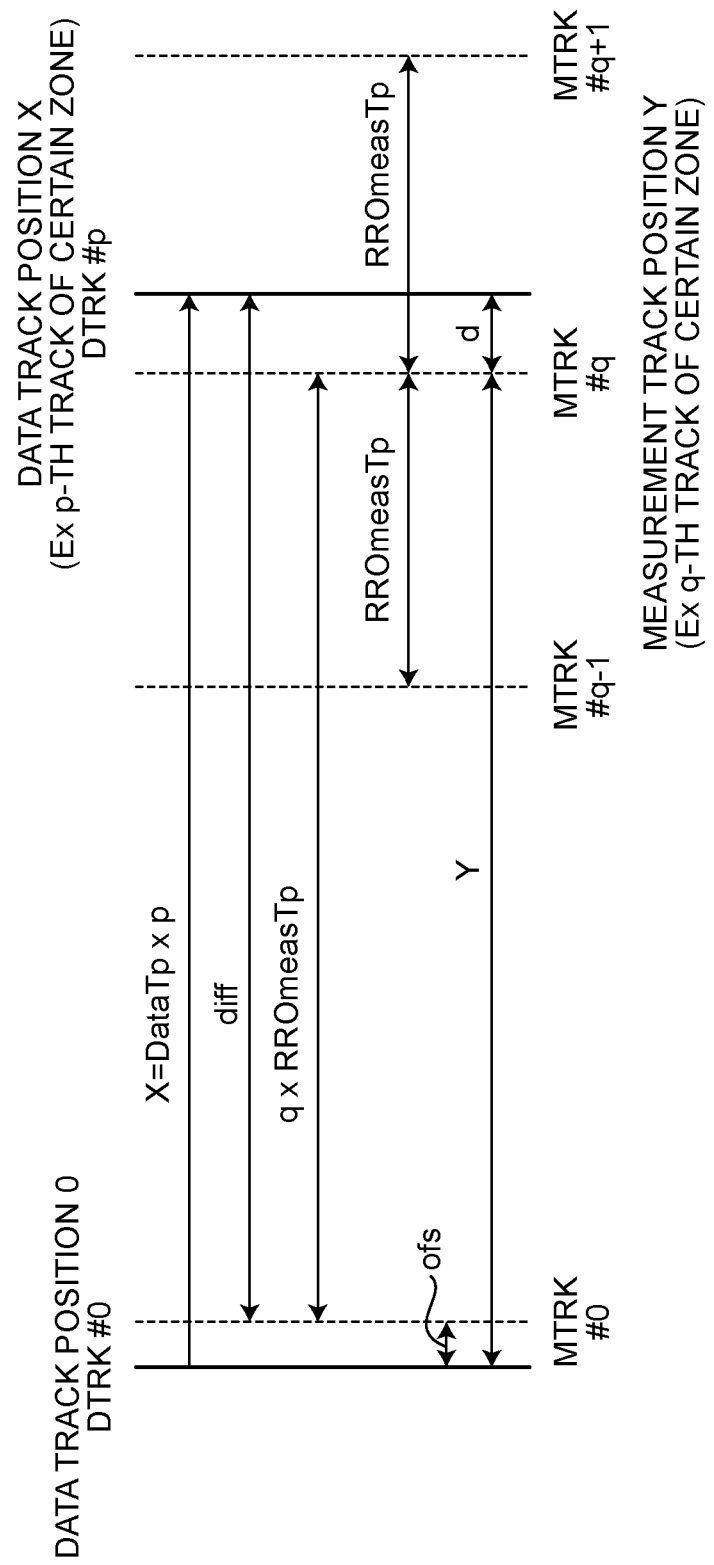
FIG. 10 is a diagram illustrating an example of a method of calculating the write permissible range change determination distance d.

FIG. 10 is a diagram illustrating an example of a method of calculating the write permissible range change determination distance d;

In FIG. 10, the position of the data track DTRK at a position (radial position) X is denoted as a data track position X. The data track DTRK at the data track position X illustrated in the drawing is, for example, a p-th data track DTRK in a certain zone. Here, p is an integer of 0 or more. The track pitch of the data track DTRK of the zone is denoted as DataTp. In addition, the position of the start data track DTRK of the zone is assumed to be 0 (origin). The data track position X can be expressed by the following Formula (1).

$$X = \text{DataTp} \times p \quad (1)$$

In FIG. 10, each dotted line indicates the position of the measurement track MTRK. The distance between the origin and the position of the first measurement track MTRK in the zone is denoted as ofs. The position Y of the q-th measurement track MTRK can be expressed by the following Formula (2). Here, q is an integer of 0 or more.

$$Y = \textit{ofs} + q \times \text{RROmeasTp} \quad (2)$$

The write permissible range change determination distance d between the data track DTRK #p located at the data track position X and the measurement track MTRK #q closest to the data track DTRK #p is obtained by the following procedure.

First, the dWOS calculation unit 33 acquires a difference diff obtained by subtracting a distance ofs from the data track position X according to the following Formula (3).

$$\text{diff} = X - \textit{ofs} \quad (3)$$

Subsequently, the dWOS calculation unit 33 subtracts Y from the difference diff. Here, q is the number of measurement tracks MTRK existing between the data track position 0 and the data track position X, and is equal to an integer part obtained by dividing the difference diff by RROmeasTp. The dWOS calculation unit 33 calculates q and a remainder R according to the following Formulas (4) and (5).

$$q = \text{int}(\text{diff}/\text{RROmeasTp}) \quad (4)$$

$$R = \text{diff} - q \times \text{RROmeasTp} \quad (5)$$

In a case where R is larger than 0.5×RROmeasTp, the dWOS calculation unit 33 sets a value obtained by subtracting RROmeasTp from the remainder R as the write permissible range change determination distance d. In a case where R is smaller than 0.5×RROmeasTp, the dWOS calculation unit 33 sets the remainder R as the write permissible range change determination distance d. The write permissible range change determination distance d calculated in this manner is a value in a range from $-0.5 \times \text{RROmeasTp}$ to $0.5 \times \text{RROmeasTp}$.

Note that the method described with reference to FIG. 10 is merely an example of a method of calculating the write permissible range change determination distance d. The position of each measurement track MTRK, the position of each data track DTRK, and the position of the target data track DTRK are known, and thus, the dWOS calculation unit 33 calculates the write permissible range change determination distance d using these pieces of known information. The calculation method may be changed according to the arrangement of each data track DTRK, the arrangement of each measurement track MTRK, and the like.

Now, description will continue by returning to FIG. 9. After calculating the write permissible range change determination distance d, the dWOS calculation unit 33 refers to the dWOS table 52 and acquires the change amount dWOS corresponding to the write permissible range change determination distance d (S103).

The WOS setting unit 32 calculates a WOS set value $\text{WOS}_{target}$ of the target data track DTRK on the basis of the reference value $\text{WOS}_{ref}$ acquired by the processing of S101 and the change amount dWOS acquired by the processing of S103 (S104). According to the example described above, the WOS setting unit 32 acquires the set value $\text{WOS}_{target}$ by adding the reference value $\text{WOS}_{ref}$ and the change amount dWOS.

The controller 30 executes the write operation for the target data track DTRK using the set value $\text{WOS}_{target}$ (S105). This completes the write operation.

Figure 11:
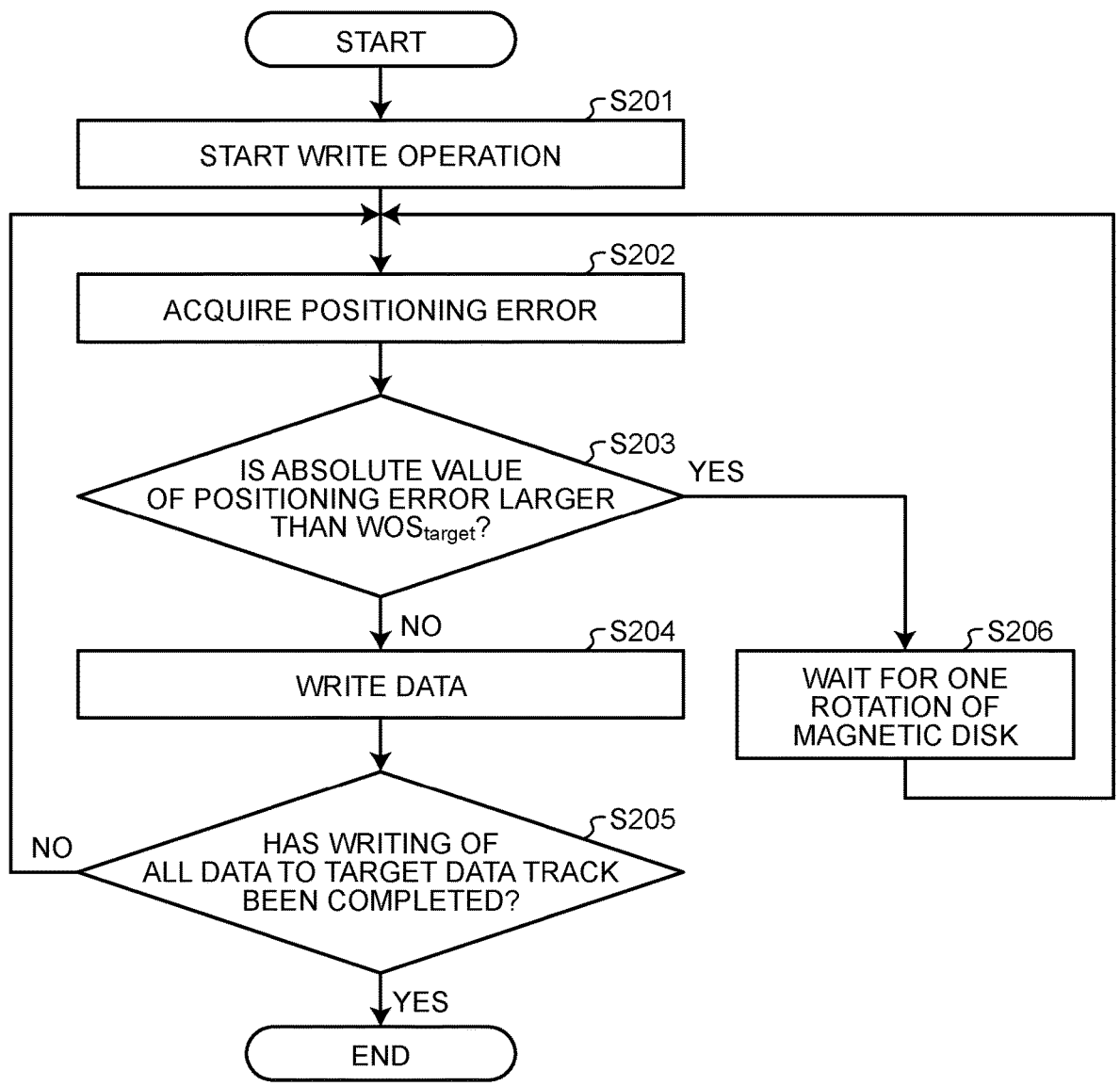
FIG. 11 is a flowchart illustrating an example of a write operation using a set value $WOS_{target}$ of the embodiment.

FIG. 11 is a flowchart illustrating an example of a write operation using a set value $\text{WOS}_{target}$ of the embodiment.

When the write operation is started (S201), the controller 30 acquires a positioning error when the magnetic head 22 passes through the servo region SV (S202). On the basis of servo data, the controller 30 executes positioning control of positioning the magnetic head 22 above the target data track DTRK. In the positioning control, the RRO correction value in the target data track DTRK is acquired by linear interpolation using RRO correction values obtained by RRO measurement in measurement tracks MTRK, so as to execute the RRO correction operation using the acquired RRO correction value, namely, the linear RRO correction operation. During execution of positioning control, the controller 30 acquires the amount of deviation of the magnetic head 22 from the track center as a positioning error.

Note that S202 to S205 constitute loop processing. The controller 30 executes the loop processing every time the magnetic head 22 passes through the servo region SV.

After S202, the controller 30 determines whether the absolute value of the positioning error is larger than the set value $\text{WOS}_{target}$ (S203). The controller 30 determines whether the position of the magnetic head 22 deviates from the write permissible range.

In response to determining that the absolute value of the positioning error is not larger than the set value $\text{WOS}_{target}$ (S203: No), the position of the magnetic head 22 can be estimated not to deviate from the write permissible range. In this case, the controller 30 executes data writing on the data region DA subsequent to the servo region SV that has passed immediately before (S204). Subsequently, the controller 30 determines whether writing of all write target data to the target data track DTRK has been completed (S205).

In response to determining that the writing of all the write target data to the target data track DTRK is completed (S205: Yes), the write operation ends. When the writing of all the write target data to the target data track DTRK has not been completed yet (S205: No), the control transitions to S202.

In response to determining that the absolute value of the positioning error is larger than the set value $\text{WOS}_{target}$ (S203: Yes), the position of the magnetic head 22 can be estimated to deviate from the write permissible range. Accordingly, the controller 30 waits for one rotation of the magnetic disk 11 while suppressing execution of writing (S206). When the magnetic disk 11 makes one rotation, the control transitions to S202, and execution of the processing from S202 is resumed.

In this manner, in a case where the position of the magnetic head 22 deviates from the write permissible range, the write operation is interrupted, and in a case where the magnetic head 22 approaches the interruption position of the write operation again, the processing from S202 is resumed.

According to the procedure illustrated in FIG. 11, when the absolute value of the positioning error is equal to the set value $\text{WOS}_{target}$, the control transitions to S204 to execute data writing. The processing when the absolute value of the positioning error is equal to the set value $\text{WOS}_{target}$ is not limited thereto. When the absolute value of the positioning error is equal to the set value $\text{WOS}_{target}$, the control may transition to S206.

The dWOS table 52 is generated in a manufacturing step. In the manufacturing step, the controller 30 of the magnetic disk apparatus 1 may generate the dWOS table 52 on the basis of dedicated firmware. Alternatively, in the manufacturing step, the magnetic disk apparatus 1 may be connected to a test device, and a test device may control the magnetic disk apparatus 1 to generate the dWOS table 52.

Figure 12:
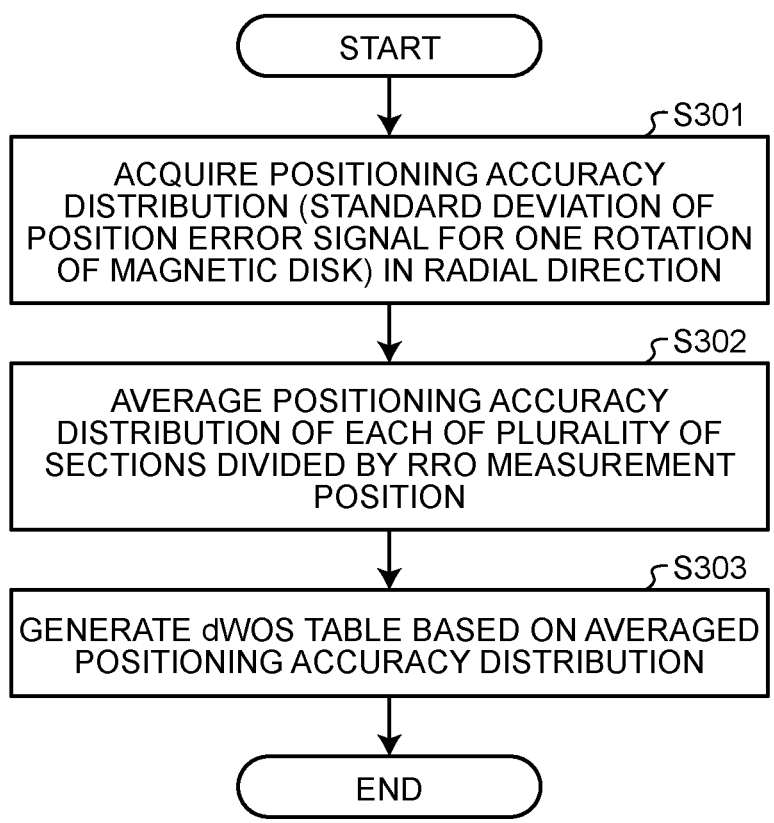
FIG. 12 is a flowchart illustrating an example of a method of generating a dWOS table according to the embodiment.

FIG. 12 is a flowchart illustrating an example of a method of generating the dWOS table 52 according to the embodiment. It is assumed here that the controller 30 generates the dWOS table 52 on the basis of dedicated firmware.

First, the controller 30 acquires a distribution of positioning accuracy in the radial direction (S301). The controller 30 measures the positioning accuracy at each of positions in the radial direction, thereby acquiring the distribution of the positioning accuracy in the radial direction as illustrated in FIG. 4. In FIG. 12, the positioning accuracy is represented by, as one example, the standard deviation of the position error signal for one rotation of the magnetic disk. Note that the controller 30 can acquire an optional evaluation index as the positioning accuracy as long as the evaluation index corresponds to the positioning accuracy.

Subsequently, the controller 30 averages the positioning accuracy distribution of each of the sections segmented by the measurement track MTRK (S302). For example, the controller 30 acquires the distribution in the sections by dividing the distribution in the radial direction of the positioning accuracy in each measurement track MTRK such as the distribution in the section from the measurement track MTRK #0 to the measurement track MTRK #1 and the distribution in the section from the measurement track MTRK #1 to the measurement track MTRK #2. By averaging the distribution in the sections, the controller 30 acquires an average of the distribution in the section segmented by the two adjacent measurement tracks MTRK.

Subsequently, the controller 30 generates the dWOS table 52 on the basis of the averaged positioning accuracy distribution in the section segmented by the two adjacent measurement tracks MTRK (S303).

For example, when the controller 30 has determined the change amount dWOS for the write permissible range change determination distance d so that the data of the adjacent data track can be guaranteed regardless of the write permissible range change determination distance d, the dWOS table 52 that defines the correspondence relationship as illustrated in FIG. 7 is generated.

Alternatively, for example, when the controller 30 has determined the change amount dWOS for the write permissible range change determination distance d so that the write performance can be guaranteed regardless of the write permissible range change determination distance d, the dWOS table 52 that defines the correspondence relationship as illustrated in FIG. 8 is generated.

The dWOS table 52 generated in S303 is stored in a predetermined storage area. This completes the operation of generating the dWOS table 52.

Note that the dWOS table 52 generated in one magnetic disk apparatus 1 may also be used in one or more other magnetic disk apparatuses 1. Alternatively, each magnetic disk apparatus 1 may individually generate the dWOS table 52. In addition, the dWOS table 52 may be generated for each head and each zone.

As described above, according to the embodiment, the controller 30 acquires, in the write operation, the RRO correction value in the target data track DTRK by interpolation using the RRO correction value in each of the measurement tracks MTRK. Subsequently, when positioning the magnetic head 22 on the target data track DTRK, the controller 30 executes the RRO correction using the acquired RRO correction value. In the write operation, the controller 30 sets the set value $WOS_{target}$ on the basis of the write permissible range change determination distance d between the target data track DTRK and the measurement track MTRK closest to the target data track DTRK among the measurement tracks MTRK. The controller 30 executes writing on the target data track DTRK in a case where the positioning error is smaller than the set value $WOS_{target}$. When the positioning error is larger than the set value $WOS_{target}$, the controller 30 withholds writing on the target data track DTRK.

This makes it possible to suppress the capacity of the nonvolatile storage area required to store the information regarding the WOS. Therefore, the WOS can be suitably set.

According to the dWOS table 52 illustrated in FIG. 7, it is reasonable to consider that the write permissible range change determination distance d of a first value is correlated with the change amount dWOS of a second value and that the write permissible range change determination distance d of a third value having an absolute value larger than the absolute value of the first value is correlated with the change amount dWOS of a fourth value smaller than the second value.

By using the dWOS table 52, it is possible to guarantee the data of the adjacent data track regardless of the write permissible range change determination distance d.

In addition, in a case where the WOS is set using the dWOS table 52 illustrated in FIG. 7, the WOS setting unit 32 can perform WOS setting such that, when the write permissible range change determination distance d is a first value, a fifth value is to be set as the set value $WOS_{target}$, and when the write permissible range change determination distance d is a third value having an absolute value larger than the absolute value of the first value, a sixth value smaller than the fifth value is to be set as the set value $WOS_{target}$.

Accordingly, it is possible to guarantee the data of the adjacent data track regardless of the write permissible range change determination distance d.

In addition, according to the dWOS table 52 illustrated in FIG. 8, it is reasonable to consider that the write permissible range change determination distance d of the first value is correlated with the change amount dWOS of a seventh value and that the write permissible range change determination distance d of the third value having an absolute value larger than the absolute value of the first value is correlated with the change amount dWOS of an eighth value larger than the seventh value.

By using the dWOS table 52, the write performance can be guaranteed regardless of the write permissible range change determination distance d.

In addition, in a case where the WOS is set using the dWOS table 52 illustrated in FIG. 8, the WOS setting unit 32 can perform WOS setting such that, when the write permissible range change determination distance d is the first value, a ninth value is to be set as the set value $WOS_{target}$, and when the write permissible range change determination distance d is the third value having an absolute value larger than the absolute value of the first value, a tenth value larger than the ninth value is to be set as the set value $WOS_{target}$.

Accordingly, the write performance can be guaranteed regardless of the write permissible range change determination distance d.

As described with reference to FIG. 12, the controller 30 evaluates a positioning error at an optional radial position, and generates the dWOS table 52 on the basis of the positioning accuracy measured in sections segmented by RRO measurement positions.

By using the dWOS table 52 generated in this manner, the controller 30 can suitably perform the WOS setting.

While some embodiments have been described, these embodiments have been presented by way of example only and are not intended to limit the scope of the inventions. Indeed, the novel embodiments described herein can be embodied in a variety of other forms; moreover, various omissions, substitutions and changes can be made without departing from the gist of the inventions. These embodiments or modifications thereof are included in the scope or the gist of the inventions and are included in the inventions described in the claims and an equivalent scope thereof.

What is claimed is:

1. A magnetic disk apparatus comprising:
   a magnetic head;
   a magnetic disk on which multiple data tracks are provided; and
   a controller configured to, in a write operation using the magnetic head onto one of the multiple data tracks,
      perform interpolation using first repeatable runout (RRO) correction values to acquire a second RRO correction value, the first RRO correction values being obtained by performing RRO measurement at multiple first positions, the second RRO correction value being an RRO correction value at a second position, the multiple first positions being radial positions in a radial direction of the magnetic disk, the second position being a position of a first data track being the one of the multiple data tracks,
      execute RRO correction using the second RRO correction value when positioning the magnetic head above the first data track,
      set a write permission threshold based on a write permissible range change determination distance between one of the multiple first positions closest to the second position and the second position, acquire a positioning error when positioning the magnetic head above the first data track, execute writing on the first data track when the positioning error is not larger than the write permission threshold, and withhold writing on the first data track when the positioning error of the first data track is larger than the write permission threshold.

2. The magnetic disk apparatus according to claim 1, wherein the controller is further configured to, when an absolute value of the write permissible range change determination distance is a first value, set the write permission threshold to be a second value, and, when the absolute value of the write permissible range change determination distance is a third value larger than the first value, set the write permission threshold to be a fourth value smaller than the second value.

3. The magnetic disk apparatus according to claim 1, wherein the controller is further configured to, when an absolute value of the write permissible range change determination distance is a first value, set the write permission threshold to be a second value, and, when the absolute value of the write permissible range change determination distance is a third value larger than the first value, set the write permission threshold to be a fourth value larger than the second value.

4. The magnetic disk apparatus according to claim 1, further comprising a storage device configured to store a reference value of the write permission threshold and first information defining a correspondence relationship between a multi-valued write permissible range change determination distance and a multi-valued change amount of the write permission threshold, wherein the controller is further configured to acquire, based on the first information, a change amount of a write permission threshold corresponding to the write permissible range change determination distance, and acquire the write permission threshold based on the reference value of the write permission threshold and the acquired change amount of the write permission threshold.

5. The magnetic disk apparatus according to claim 4, wherein the first information represents that, when an absolute value of the write permissible range change determination distance is a first value, a first write permission threshold change amount is correlated with the first value, and, when an absolute value of the write permissible range change determination distance is a third value larger than the first value, a second write permission threshold change amount smaller than the first write permission threshold change amount is correlated with the third value, and the controller is further configured to acquire the write permission threshold by adding the reference value of the write permission threshold and the acquired change amount of the write permission threshold.

6. The magnetic disk apparatus according to claim 5, wherein the controller is further configured to evaluate a positioning error at an optional radial position, and generate the first information based on positioning accuracy measured in sections segmented by the multiple first positions.

7. The magnetic disk apparatus according to claim 4, wherein the first information represents that, when an absolute value of the write permissible range change determination distance is a first value, a first write permission threshold change amount is correlated with the first value, and, when an absolute value of the write permissible range change determination distance is a third value larger than the first value, a second write permission threshold change amount larger than the first write permission threshold change amount is correlated with the third value, and the controller is further configured to acquire the write permission threshold by adding the reference value of the write permission threshold and the acquired change amount of the write permission threshold.

8. The magnetic disk apparatus according to claim 7, wherein the controller is further configured to evaluate a positioning error at an optional radial position, and generate the first information based on positioning accuracy measured in sections segmented by the multiple first positions.

9. The magnetic disk apparatus according to claim 4, wherein the controller is further configured to evaluate a positioning error at an optional radial position, and generate the first information based on positioning accuracy measured in sections segmented by the multiple first positions.

10. A method comprising:

performing a write operation using a magnetic head onto one of multiple data tracks provided on a magnetic disk, the write operation including, performing interpolation using first repeatable runout (RRO) correction values to acquire a second RRO correction value, the first RRO correction values being obtained by performing RRO measurement at multiple first positions, the second RRO correction value being an RRO correction value at a second position, the multiple first positions being radial positions in a radial direction of the magnetic disk, the second position being a position of a first data track being the one of the multiple data tracks, executing RRO correction using the second RRO correction value when positioning the magnetic head above the first data track, setting a write permission threshold based on a write permissible range change determination distance between one of the multiple first positions closest to the second position and the second position, acquiring a positioning error when positioning the magnetic head above the first data track, executing writing on the first data track when the positioning error is not larger than the write permission threshold, and withholding writing on the first data track when the positioning error is larger than the write permission threshold.

11. The method according to claim 10, further comprising:

when an absolute value of the write permissible range change determination distance is a first value, setting the write permission threshold to be a second value; and, when the absolute value of the write permissible range change determination distance is a third value larger than the first value, setting the write permission threshold to be a fourth value smaller than the second value.

12. The method according to claim 10, further comprising:
when an absolute value of the write permissible range change determination distance is a first value, setting the write permission threshold to be a second value; and,
when the absolute value of the write permissible range change determination distance is a third value larger than the first value, setting the write permission threshold to be a fourth value larger than the second value.

13. The method according to claim 10, further comprising:
acquiring, based on first information, a change amount of a write permission threshold corresponding to the write permissible range change determination distance, the first information defining a correspondence relationship between a multi-valued write permissible range change determination distance and a multi-valued change amount of the write permission threshold; and
acquiring the write permission threshold based on a reference value of the write permission threshold and the acquired change amount of the write permission threshold.

14. The method according to claim 13, wherein
the first information represents that,
when an absolute value of the write permissible range change determination distance is a first value, a first write permission threshold change amount is correlated with the first value, and,
when an absolute value of the write permissible range change determination distance is a third value larger than the first value, a second write permission threshold change amount smaller than the first write permission threshold change amount is correlated with the third value, and
the method further comprises acquiring the write permission threshold by adding the reference value of the write permission threshold and the acquired change amount of the write permission threshold.

15. The method according to claim 14, further comprising:
evaluating a positioning error at an optional radial position; and
generating the first information based on positioning accuracy measured in sections segmented by the multiple first positions.

16. The method according to claim 13, wherein
the first information represents that,
when an absolute value of the write permissible range change determination distance is a first value, a first write permission threshold change amount is correlated with the first value, and,
when an absolute value of the write permissible range change determination distance is a third value larger than the first value, a second write permission threshold change amount larger than the first write permission threshold change amount is correlated with the third value, and
the method further comprises acquiring the write permission threshold by adding the reference value of the write permission threshold and the acquired change amount of the write permission threshold.

17. The method according to claim 16, further comprising:
evaluating a positioning error at an optional radial position; and
generating the first information based on positioning accuracy measured in sections segmented by the multiple first positions.

18. The method according to claim 13, further comprising:
evaluating a positioning error at an optional radial position; and
generating the first information based on positioning accuracy measured in sections segmented by the multiple first positions.

* * * * *